Sept. 17, 1935. J. AUGER 2,014,997
CONTROL VALVE
Original Filed Jan. 12, 1932
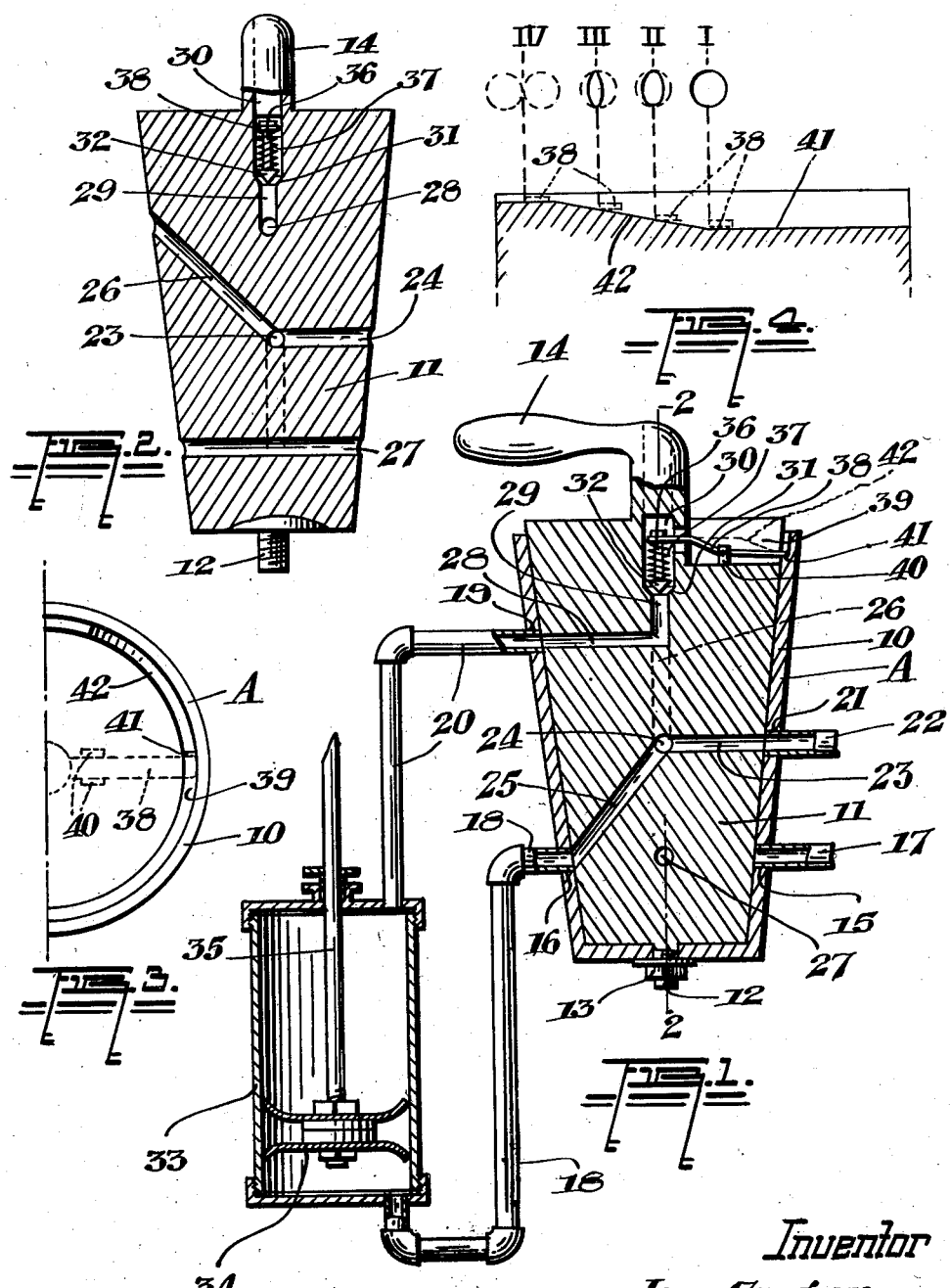
Inventor
Joe Auger
BY [signature]
Attys.

Patented Sept. 17, 1935

2,014,997

UNITED STATES PATENT OFFICE 2,014,997

CONTROL VALVE

Joe Auger, Elk Lake, Ontario, Canada

Application January 12, 1932, Serial No. 586,213
Renewed January 30, 1935

6 Claims. (Cl. 121—46.5)

This invention relates to control valves and an object of the invention is to provide a valve operated from a single control which is applicable to various types of fluid control devices such as that covered by my co-pending application Serial No. 525,223, the said valve being operable through a plurality of positions such as simultaneous pressure supply and exhaust, reverse and shut-off, with an automatically operated pressure valve to control the exhaust in one phase of operation.

A further object of the invention is to provide a single control valve which is operable to control a plurality of pressure medium conduits supplied from a single introductory conduit, with the inclusion of an automatic pressure valve or exhaust in one phase of operation, thus taking the place of individual controls and a separate governor.

A still further object of the invention is to provide a valve of very simple character which will be inexpensive to manufacture.

With these and other objects in view the invention consists essentially of a valve casing carrying a rotary valve spindle formed with a plurality of passages therein extending in varied planes, adapted to alternately communicate with inlet and discharge passageways communicating with the valve casing, one of said passageways exhausting directly to the atmosphere during one phase of operation, through the medium of an automatically controlled pressure valve, with the provision of a single conduit for introducing the pressure medium to the rotary valve, from which it is supplied to the device to be operated, through valve connecting conduits, and according to the manipulation of the rotary valve, as more fully described in the present specification and illustrated in the accompanying drawing which forms part of the same.

In the drawing, Figure 1 is a sectional elevation of the valve showing the position of the conduits and the formation of the passageways through the valve spindle when the valve is in a position to normally feed the piston, showing the exhaust line in a position to exhaust to the atmosphere through the pressure valve.

Figure 2 is a longitudinal section taken through the valve spindle on the line 2—2 of Figure 1, showing the position of the passageways therethrough when the spindle is turned to the opposite position to that illustrated in Figure 1.

Figure 3 is a fragmentary plan view of the valve spindle and casing, illustrating the formation of the casing designed to control the operation of the pressure valve, the control lever being illustrated in dotted lines.

Figure 4 is a diagrammatic view of the formation of the shoulder on the valve casing, illustrating the change in elevation of said shoulder to control the operation of the pressure valve, the position of the lever being illustrated in dotted lines in conjunction with the shoulder, the corresponding position of the valve port being illustrated above each position of the lever.

Referring more particularly to the drawing, A indicates the valve as a whole, which includes the casing 10 within which is mounted the rotary valve spindle 11 provided with the lower pintle 12 extending through the casing and rotatably securing the spindle therein by means of a nut or other securing device 13. The spindle is operated by means of the manual control 14, which is preferably formed integral with the spindle. This provides for the manual rotation of the spindle.

In the side walls of the casing 10 orifices 15 and 16 are provided, said orifices being diametrically opposite each other, the orifice 15 being connected to conduit 17 and serving always as an exhaust outlet; the orifice 16 being designed to receive the conduit 18 and serving alternatively as an introductory orifice or exhaust orifice according to the manipulation of the spindle 11. A further orifice 19 is provided in the upper end of the casing 10 in substantially vertical alignment with the orifice 16. The orifice 19 is designed to receive the conduit 20 and to serve alternatively as an exhaust orifice or an introductory orifice according to the manipulation of the valve. The orifices 16 and 19 in the casing 10 therefore serve a similar purpose.

In one side of the casing 10 a main orifice 21 is provided with which is connected the main pressure supply conduit 22. This serves for introducing the pressure medium to the valve through a single line from which it is distributed to its proper discharge according to the manner in which the spindle is operated.

A main introductory passageway 23 is provided in the spindle which is bored transversely of the spindle and preferably terminates centrally of the spindle. Corresponding to this passageway 23 is the auxiliary passageway 24, which is positioned at right angles to the passageway 23 and functions in a similar manner thereto when the valve spindle is turned to a second operating position.

Inclined passageways or discharge conduits 25 and 26 are bored in the spindle from different areas of the walls thereof, each of which communicates at a definite or central point with the main passageway 23 and auxiliary passageway 24. The passageway 25 extends at an incline downwardly from the passageways 23 and 24 and communicates with the exterior of the spindle at a level which corresponds with the orifice 16, so that at one point during the operation of the spindle, the passageway 25 will directly register with the orifice 16. Similarly the passageway 26 extends upwardly at an incline from the passageways 23 and 24 and communicates with the exterior of the spindle in an area at right angles to the passageway 25 and at a level corresponding with the position of the orifice 19, so that at one position in the operation of the spindle, the passageway 26 will communicate with the orifice 19.

Below the passageway 24 a transverse passageway 27 is bored completely through the spindle so that it has an outlet on each side thereof. This passageway extends parallel to the passageway 24 and at right angles to the passageway 23. Thus, when passageway 24 is in register with the orifice 21 and the conduit 22, and the inclined passageway 26 is in register with the orifice 19 and conduit 20, the passageway 27 will be in register with the orifices 15 and 16 and conduits 17 and 18, the valve thus assuming the position shown in Figure 2.

In the upper part of the spindle a passageway 28 is provided corresponding to the passageway 27 but at right angles thereto, the passageway 28 being parallel with the passageway 23. The passageway 28 is bored at a level to register with the orifice 19 but instead of being bored completely through the spindle similarly to the passageway 27, the passageway 28 merely extends to the centre of the spindle where it communicates with an upwardly disposed passageway 29, discharging to the atmosphere. The passageway 29 preferably extends into a part of the control 14 and is enlarged in its upper area as at 30, being formed with a valve seat 31 upon which the pressure valve 32 is designed to seat. This pressure valve and associated mechanism will be hereinafter more fully described.

The conduits 18 and 20 communicating with the casing 10 are designed to communicate at their other extremities with the opposite sides of a cylinder 33 and to operate the piston 34 therein. The piston rod 35 is normally connected to some apparatus such as a rock drill, as described in my co-pending application referred to, and the control valve serves to control the operation of such a device.

In the position illustrated in Figure 1, the piston is starting its power stroke, pressure being supplied from the conduit 22 through the passageway 23, inclined passageway 25 and conduit 18, the pressure medium on the opposite side of the piston being exhausted through the conduit 20, passageways 28 and 29, through the exhaust valve 32 to the atmosphere. When the piston rod has moved through its power stroke, the spindle 11 is manually reversed so that the spindle assumes the position illustrated in Figure 2. In this position the pressure medium feeds through the conduit 22, passageway 24, inclined passageway 26 and conduit 20, the pressure medium on the oposite side of the piston exhausting through conduit 18, transverse passageway 27 and exhaust conduit 17.

During the feeding operation it is very essential that the feed of the pressure medium be controlled and correspondingly that the pressure medium from the opposite side of the piston be controlled. For instance, when the apparatus is operating as a rock drill, it may be found that the drill is feeding too rapidly, which will immediately cause pounding of the drill and consequently extreme vibration to the apparatus. It is necessary, therefore, that the feed of the pressure medium be lessened and that the exhaust of the pressure medium on the opposite side of the piston be properly controlled and this is taken care of through the operation of the spindle and the pressure valve 32. This valve is mounted on the pin 36 which also carries the coil spring 37. Loosely connected to the pin 36 is a control lever 38 which is mounted on the pin between the end thereof and the coil spring 37.

The lever 38 is mounted in a recess 39 formed in the spindle, being pivoted to the lug 40 and projecting from the spindle so that one end normally rests upon the shoulder 41 of a recessed portion of the interior of the casing 10. The depth of this recess is varied so that the shoulder extends at an incline over a portion of its area, as illustrated diagrammatically in Figure 4 at 42.

It will be realized that when the valve spindle 11 is turned about its axis, the lever 38 will move therewith and its outer end will move along the shoulder 41. In normal feeding position, as illustrated in Figure 1, the lever 38 will be in position I as illustrated in Figure 4, when the passageway 28 will completely register with the orifice 19. When, however, this spindle is moved so that passageway 28 only registers to substantially three-quarters of its area with the orifice 19, the lever 38 will be in the position illustrated in position II in Figure 4. The outer end of the lever 38, when it travels up the inclined portion 42 of the shoulder 41, pivots on the lug 40 and the oposite end of the lever depresses the coil spring 37 and consequently presses the valve 32 more firmly on its seat 31, thus slowing up the exhaust of the pressure medium from within the cylinder on one side of the piston and requiring a greater pressure for exhaust. This necessarily controls the power stroke of the piston and attached apparatus.

Similarly, when the spindle is moved further and the passageway 28 registers, for instance, only one-quarter of its area with the orifice 19, the lever 38 will be in a position illustrated as position III in Figure 4, thus placing more pressure upon the pressure valve 32. It follows, therefore, that when, during the turning movement of the spindle, the lever 38 reaches position IV illustrated in Figure 4, the passageway 28 will be closed and out of register with the orifice 19.

Consequently, it will be realized that, as the valve spindle 11 is rotated from its normal feeding position illustrated in Figure 1, as the lever 38 moves up the incline, it will depress the spring 37 to tighten the valve 32 on its seating as the passageway 28 gradually moves out of register with orifice 19. Likewise, when the valve spindle 11 is turned back to its normal feeding position as illustrated in Figure 1, as the passageway 29 comes gradually into register with the orifice 19, the lever 38 is sliding down the incline 42 and the pressure on the valve 32 is gradually lessened until it is at a minimum when the port is wide open at the point where the passageway 29 completely registers with the orifice 19.

The operation is briefly as follows. Assuming the spindle to be in the position illustrated in Figure 1, the pressure medium is fed from the conduit 22 through passageways 23 and 25 in the valve spindle and thence through conduit 18 to one end of the cylinder. This forces the piston forwardly in the cylinder and the pressure medium on the opposite side of the piston exhausts through conduit 20, passageways 28 and 29 and through valve 32 to the atmosphere, the exhausting of the pressure medium being controlled in accordance with the position of the valve spindle, as previously explained, so that the forward movement of the piston may be very readily checked and moved forward at a very slow speed During this operation, the passageway 27 and the passageway 26 are closed by the casing 10. Upon reversing the valve spindle 11, passageway 24 is brought into register with conduit 22, passageway 27 with the conduits 17 and 18, and passageway 26 with the conduit 20. The pressure medium then feeds through conduit 22, passageways 24 and 26, conduit 19 to the cylinder, thus forcing the piston 34 backward in the cylinder 33, the pressure medium on the opposite side of the piston exhausting through conduit 18, passageway 27 and conduit 17. During this phase of operation, no pressure control is acting upon the exhausting gases and the rearward movement of the piston is therefore of normal speed. During this phase of the operation the passageways 23 and 25 are closed by the casing 10.

It is, therefore, readily apparent that I have provided a control valve mechanism which, through a single control, will operate piston or like mechanism through a forward and rearward motion in which the speed of the piston when moving in one direction is directly controlled automatically to a degree and it is further apparent that by adjusting the pressure of the coil spring 37 any desired ratio of pressure in the exhaust line can be provided for.

The manual control 14 may be applied in various ways, being formed integral if desired or detachable. The valve 32 is inserted in the upper area 30 of the passageway 29 and the lever 38 attached thereto after insertion, the connection being made in any suitable way. The connection can be effected before the valve 32 is inserted, if the manual control is detachable or even if it is integral by merely enlarging the opening in the side of the manual control. The size of this opening has no material bearing on the operation of the device. In forming the manual control integral the passageway 29 and enlargement 30 is effected by boring through the end of the manual control as indicated in dotted lines in Figures 1 and 2.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim as my invention is:—

1. A control valve comprising a casing, a valve spindle in said casing formed with a plurality of pressure medium feeding and exhausting passageways therein, designed to simultaneously and alternately connect a pair of conduits with a pressure supply and an exhaust and a pressure valve in one of said exhaust passageways designed to control the rate of discharge of the exhausting pressure medium, from one of said conduits, said pressure valve being provided with means for increasing or decreasing the pressure of the valve according to the operation of the spindle.

2. A control valve comprising a casing, a valve spindle in said casing formed with a plurality of pressure medium feeding and exhausting passageways therein, designed to simultaneously and alternately connect a pair of conduits with a pressure supply and an exhaust and a pressure valve in one of said exhaust passageways designed to control the rate of discharge of the exhausting pressure medium, from one of said conduits, said pressure valve being spring pressed and having a lever connected thereto and means in connection with said control valve for acting upon said lever to increase or decrease the pressure of the pressure valve according to the operation of the spindle.

3. A control valve comprising a casing, a spindle in said casing formed with a plurality of pressure medium feeding passageways extending in varied planes and centrally communicating with one another, said passageways being designed to alternately connect two conduits with a pressure medium supply according to the operation of said spindle, exhaust passageways formed in said spindle adapted to communicate with said conduits to permit them to exhaust according to the operation of said spindle and a pressure valve in one of said exhaust passageways designed to control the rate of discharge of the exhaust pressure medium from one of said conduits, one of said exhaust passageways communicating with an exhaust conduit and the other of said exhaust passageways communicating directly with the atmosphere through said pressure valve.

4. A control valve comprising a casing, a valve spindle in said casing formed with a plurality of pressure medium feeding and exhausting passageways therein, designed to simultaneously and alternately connect a pair of conduits with a pressure supply and an exhaust, a pressure valve in one of said exhaust passageways designed to control the rate of discharge of the exhausting pressure medium, from one of said conduits, a pivoted lever having one end connected to said pressure valve and the opposite end projecting over and engaging a shoulder formed on said casing, said shoulder being formed with an inclined portion designed to act upon said lever to increase or decrease the pressure of the valve according to the direction of travel of the lever upon said shoulder during operation of the spindle.

5. A device as claimed in claim 4 in which a recess is provided in the spindle within which the lever is pivotally mounted and adapted to project therefrom over said shoulder.

6. The combination with a control valve of a pressure valve designed to control the rate of the discharge of exhausting pressure medium from a passageway in the control valve, said pressure valve designed to sit in said passageway, and formed with a pin having a coil spring thereon, a lever loosely mounted on said pin adapted to act upon said coil spring, said lever being pivoted on the control valve and projecting therefrom to engage with a shoulder formed on the control valve casing, said shoulder extending in two planes joined by an inclined surface, said surface serving to act upon the lever to increase or decrease the pressure on the pressure valve according to the direction of movement of the control valve.

JOE AUGER.